United States Patent [19]
Suk

[11] Patent Number: 5,529,130
[45] Date of Patent: Jun. 25, 1996

[54] ROOT CUTTER

[76] Inventor: Yong S. Suk, 864 51st Ave., Lachine, Quebec, Canada, H8T 2W6

[21] Appl. No.: 189,881

[22] Filed: Feb. 1, 1994

[51] Int. Cl.$^6$ .............................. A01B 1/04; A01B 1/14; A01B 1/16; B66F 3/00
[52] U.S. Cl. .......................... 172/380; 172/381; 294/49; 30/315; 30/355; 30/357
[58] Field of Search ................................... 172/378, 381, 172/380, 371; 294/49; 30/315, 355, 357, 324

[56] References Cited

U.S. PATENT DOCUMENTS

| | | | |
|---|---|---|---|
| 27,437 | 3/1860 | Fasig | 30/315 X |
| 96,740 | 11/1869 | Springstead | 30/355 X |
| 298,926 | 5/1884 | Watson | 172/381 |
| 809,840 | 1/1906 | Peisker | 294/49 |
| 888,147 | 5/1908 | Doidge | 172/378 X |
| 1,182,918 | 5/1916 | McQuaide | 172/378 X |
| 1,244,765 | 10/1917 | Oakley | 172/380 |
| 1,687,986 | 10/1928 | Miller | 172/381 |
| 1,706,658 | 3/1929 | Davis | 294/49 X |
| 1,954,250 | 4/1934 | Lee | 172/381 X |
| 2,006,672 | 7/1935 | Combs | 172/381 X |
| 2,058,225 | 10/1936 | Girardello | 172/378 X |
| 2,873,809 | 2/1959 | Loomis | 172/376 |
| 3,086,286 | 4/1963 | Faller | 30/355 X |
| 3,367,704 | 2/1968 | Kleppin | 172/378 X |
| 3,608,644 | 9/1971 | Ambrose | 172/378 |
| 3,985,382 | 10/1976 | Wheeler | 172/378 X |
| 4,135,751 | 1/1979 | Gederos | 294/49 |
| 4,334,583 | 6/1982 | Parker | 172/380 X |
| 4,895,211 | 1/1990 | Harris | 172/271 |
| 5,188,340 | 2/1993 | Green | 172/378 X |
| 5,360,071 | 11/1994 | Bergendorf | 172/378 |

FOREIGN PATENT DOCUMENTS

| | | | |
|---|---|---|---|
| 79687 | 8/1955 | Denmark | 172/380 |
| 711283 | 7/1966 | Italy | 172/378 |
| 2041203 | 9/1980 | United Kingdom | 172/380 |

Primary Examiner—Dave W. Arola
Assistant Examiner—Christopher J. Novosad
Attorney, Agent, or Firm—Swabey Ogilvy Renault; Guy J. Houle

[57] ABSTRACT

A root cutter having a blade front end portion and a rear edge provided with a handle and sufficiently wide to receive the foot of a user. The blade has a V-shaped cutting cavity at a front end. An intermediate edge, extending parallel to the rear edge, is located in the base of the cavity. The cavity has a first inward edge extending from the front end to the first end of the intermediate edge and a second inward edge extending from the front end to the second end of the intermediate edge. The inward edges are serrated cutting edges. The front end has a first arc extending from a first end of the first inward edge to a first end of the rear edge. A second arc extends form a first end of the second inward edge to a second end of the rear edge.

1 Claim, 1 Drawing Sheet

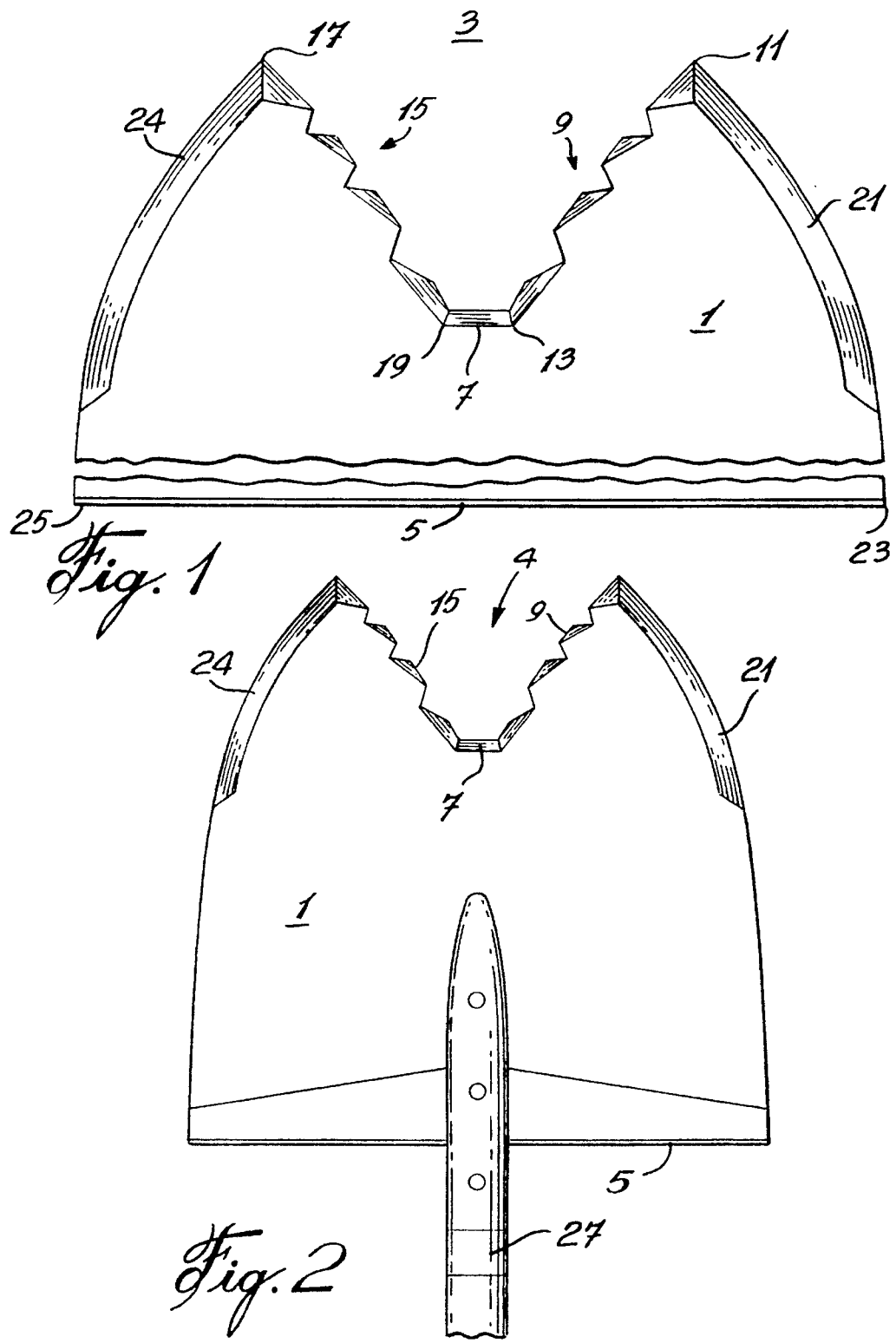

ROOT CUTTER

BACKGROUND OF THE INVENTION

1. Field of the Invention

The invention relates to a root cutter. More specifically, the invention relates to a root cutter which is adaptable to cut the roots of small trees or bushes.

2. Description of Prior Art

Root cutters, or weeding tools, or cultivating tools are known in the prior art as illustrated in, for example, U.S. Pat. Nos. 3,608,644, Ambrose, Sep. 28, 1971, 2,873,809, Loomis, Feb. 17, 1959 and 4,895,211, Harris, Jan. 23, 1990.

The Ambrose patent teaches an arrangement useful for cutting grass or small weeds. It includes a blade 16 having a V-shaped notch 18.

The cultivating tool of Loomis includes a blade 120 having a serrated edge 122. The root plow of Harris also includes a blade 12 having a V-shaped notch 14.

The Loomis patent is also useful for cultivating grass or small weeds. The plow of Harris is a large and expensive device.

SUMMARY OF INVENTION

It is therefore an object of the invention to provide a root cutter which can be used for cutting the roots of small trees or bushes.

In accordance with a particular embodiment of the invention there is provided a root cutter comprising a blade having a front end and a straight rear edge;

an intermediate edge between said front end and said rear edge and in parallel with said rear edge, said intermediate edge having a first end and a second end;

a first inward edge extending from said front end to said first end of said intermediate edge at an acute angle to said rear edge;

a second inward edge extending from said front end to said second end of said intermediate edge at an obtuse angle to said rear edge;

said inward edges comprising serrated edges;

said intermediate edge comprising a cutting edge.

BRIEF DESCRIPTION OF DRAWINGS

The invention will be better understood by an examination of the following description, together with the accompanying-drawings, in which:

FIG. 1 illustrates the blade of the root cutter in detail; and

FIG. 2 shows a handle means mounted on the blade.

DESCRIPTION OF PREFERRED EMBODIMENTS

Referring to FIG. 1, the blade, illustrated generally at 1, has a front end 3 with a V-shaped cutting cavity 4 defined therein. The blade is also provided with a straight rear edge 5. Intermediate edge 7 is disposed between the front end and the rear edge in the base of the cutting cavity 4 and is parallel to the rear edge 5. The intermediate edge 7 comprises a cutting edge.

The cavity 4 has a pair of serrated cutting inward edges 9 and 15. The edge 9 has a first end 11 and a second end 13, which extends from the front end 3 to a first end of the intermediate edge 7. The inward edge 9 extends at an acute angle to the rear edge 5.

The second inward edge 15 also extends from the front end to a second end of the intermediate edge 7. The second inward edge also has a first end 17 and a second end 19, and it extends at an angle to the rear edge 5.

The front end of the blade comprises a first arc 21 extending from the first end 11 of the inward edge 9 to a first end 23 of the rear edge 5, and a second arc extending from the first end 17 of the inward edge 15 to the second end 25 of the rear edge 5.

As seen in FIG. 2, a handle means 27 is attachable to the rear end 5 of the blade 1.

In operation, the blade is disposed so that the inward edges are adjacent to either a small tree or bushes which are to be derooted. Force can be applied to the rear edge of the blade by, for example, the foot of a user. The inward edges will cut the sides of the root and the intermediate edge will cut the rear of the root.

The root cutter is simple to use and inexpensive to make.

Although a particular embodiment has been described, this was for the purpose of illustrating, but not limiting, the invention. Various modifications, which will come readily to the mind of one skilled in the art, are within the scope of the invention as defined in the appended claims.

I claim,

1. A root cutter comprising a blade having a front end and a rear edge;

a V-shaped cutting cavity in said front end, an intermediate edge between said front end and said rear edge and parallel with said rear edge, said intermediate edge forming a base of said cavity and having a first end and a second end;

said cavity having a first inward edge extending from said front end to said first end of said intermediate edge and a second inward edge extending from said front end to said second end of said intermediate edge;

said inward edges being serrated cutting edges;

said front end having a first arc extending from a first end of said first inward edge to a first end of said rear edge;

a second arc extending from a first end of said second inward edge to a second end of said rear edge;

said intermediate edge comprising a cutting edge wherein a handle means is attached to said blade substantially centrally of said rear edge thereof, said rear edge being sufficiently wide to receive the foot of a user on opposed sides of said handle means.

* * * * *